United States Patent

[11] 3,626,369

[72] Inventor John Desmond Ainsworth
Stafford, England

[21] Appl. No. 49,090
[22] Filed June 23, 1970
[45] Patented Dec. 7, 1971
[73] Assignee The English Electric Company Limited
London, England
[32] Priority June 24, 1969
[33] Great Britain
[31] 31,799/69

[54] TELECOMMUNICATION CONTROL SYSTEM
11 Claims, 1 Drawing Fig.

[52] U.S. Cl. .......... 340/163,
321/2, 321/18, 340/310
[51] Int. Cl. .......... H02j 1/00,
H02j 3/38
[50] Field of Search .......... 340/203,
150, 163, 310; 323/101, 105; 307/24, 31, 57;
321/16, 18, 5, 2; 317/27, 28; 235/151.21

[56] References Cited
UNITED STATES PATENTS

| | | | |
|---|---|---|---|
| 3,473,039 | 10/1969 | Fegley .......... | 321/2 X |
| 3,509,537 | 4/1970 | Haberly .......... | 340/310 X |
| 3,549,977 | 12/1970 | Watkins .......... | 307/24 X |

*Primary Examiner*—Donald J. Yusko
*Attorneys*—Misegades and Douglas, Keith Misegades and George R. Douglas, Jr.

ABSTRACT: A control system for first and second converters in a high-voltage DC transmission link includes first and second control units which supply control signals I′ and I″, respectively, to the converters. The first control unit receives a main control signal I and periodically generates a coded control signal which is transmitted via a link to the second control unit. If this coded signal is error-free, a check signal is transmitted back to the first control unit via a link and the signal I″ is updated. The signal I′ is also updated if the check signal is received by the first control unit or if the main control signal is less than the signal I′ when the first converter is operating as an inverter or greater than I′ when the first converter is operating as a rectifier.

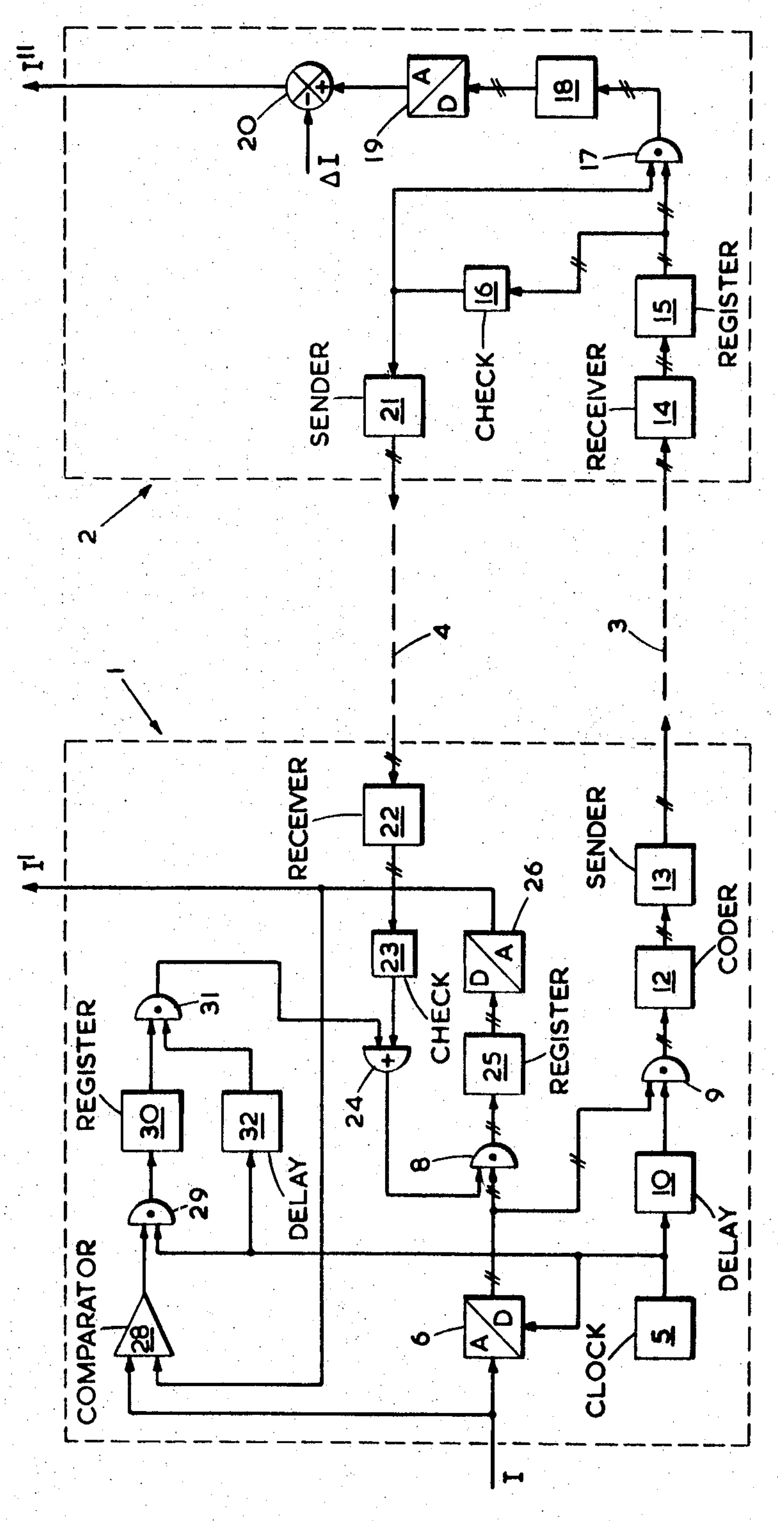
I
I'
I''
ΔI
COMPARATOR
REGISTER
DELAY
CLOCK
CODER
SENDER
RECEIVER
CHECK
A/D
D/A
1
2
3
4
5
6
8
9
10
12
13
14
15
16
17
18
19
20
21
22
23
24
25
26
28
29
30
31
32

TELECOMMUNICATION CONTROL SYSTEM

This invention relates to a telecommunication control system, and more particularly relates to a system for transmitting control signals to AC/DC converters in a high-voltage DC transmission link.

In the control of such converters the rectifier and invertor currents are controlled to be proportional to separate local current order signals derived from a main order signal, with the invertor current order being less than the rectifier current order by a current margin of, say, 0.1 per unit. Since the link may extend over a great distance, at least one of these local order signals must be transmitted to the "remote" station and a telecommunication link is employed for this purpose to transmit the signal in, e.g., digital form.

In such a scheme, any errors introduced into the transmitted signal may readily be be detected by conventional techniques, for example, by introducing parity bits, and in the event of an error the local current order signal is maintained at its previous value. However, even with this degree of control, a serious condition may still arise with a faulty telecommunication link if, for example, the main current order signal were to be decreased by reason of reduced power requirements since the possibility then exists of the signal at the remote station (e.g., the invertor), being retained at one particular value while the signal at the rectifier station falls below this level in accord with the main order.

Under these conditions there will be a collapse in the power transmission because the DC voltage will fall to zero or to a negative value.

It is an object of this invention to provide an improved control system designed to overcome this drawback.

From one aspect, the present invention provides a telecommunication control system for controlling first and second converters in a high-voltage DC transmission link, said system including first and second control units for applying first and second control signals to said first and second converters, respectively, each of which control signals is updated from time to time to cause the respective converter to supply an electrical output of a level which is required at that time, means in said first control unit for generating said first control signal in response to a main control signal and for transmitting a third control signal to said second control unit, means in said second control unit for receiving and checking said third control signal and operative if said third control signal is error-free to transmit a check signal back to said first control unit and to update said second control signal, said means in said first control unit being operative to update said first control signal only if it receives the check signal or if the main control signal bears a predetermined relationship to said first control signal.

The main control signal may conveniently be converted from analogue into digital form and the transmission may be effected in this latter mode, the digital signals being converted back into analogue form before application to their associated converter valves, where, at the invertor, the control signal is decreased in value by, e.g., 0.1 per unit compared with the rectifier order signal.

The first and second control signals may be current orders, i.e., current or power data signals or power orders.

In order that the invention may be fully understood, one embodiment thereof will now be described, by way of example, with reference to the accompanying drawing which is a schematic circuit diagram of the control system.

Referring to this drawing, a control unit 1 is situated at a converter station operating as a rectifier in a DC transmission link (not shown) and a control unit 2 is situated at a converter station operating as an invertor at the other end of the link. The unit 1 is connected to receive a main current order signal I from which a proportional local current order signal I′ is developed for the rectifying valves, and a two-way send/receive telecommunication link 3, 4 is established between this unit and unit 2 which, in turn, develops a local current order signal I″ for the inverting valves in dependence on the signal transmitted via this link. The telecommunication link may be provided over wires or by radio, light beams or other means.

More particularly, the unit 1 includes a clock pulse generator 5 which generates a steady train of short pulses at 50-millisecond intervals. The main signal I is applied to an analogue/digital converter 6 the value in which is read out in 11-bit binary in response to "sample" pulses from the clock generator 5. This parallel digital output, which is read out in about 100 microseconds, is applied to an AND gate 8, and in addition is applied to an AND gate 9 to which the clock pulses are also applied via a delay circuit 10. Thus, considering the clock pulse generated to be at time $t$=0 then, at say, $t$=300 microseconds, the digital value is applied via the gate 9 to a coding unit 12, in which extra parity bits are added according to known rules, and thence transmitted from a sender 13 over the radio telecommunication link 3 to a receiver 14 in the "remote" unit 2.

The received signal is entered into a register 15 which is checked by an error detector 16 and, if no error is detected a pulse is developed by this circuit to open a gate 17 through which the register 15 is read out. The contents of this register are entered into a further register 18, converted into a DC analogue voltage by a digital/analogue converter 19 and applied to a summator 20 where a fixed voltage representing a current order ΔI is subtracted from it to form the local current order signal I″, the current order ΔI being subtracted to provide a current margin between the inverter and the rectifier.

In addition to opening the gate 17 as described, the pulse output from the circuit 16 is transmitted from a sender 21 via the link 4 to a receiver 22 at the rectifier station. The received signal is error-checked by a circuit 23 and thence applied via an OR gate 24 to the AND gate 8 so as to enter the digital value from the converter 6 into a register 25. This "cycle" must of course be completed before $t$=50 milliseconds, i.e., before the next sampling pulse is applied to the converter 6 from the clock generator 5, and typically may be at $t$=46 milliseconds.

The contents of register 25 are converted into a DC analogue voltage in a digital/analogue converter 26 to form the local current order signal I′.

In addition to the circuitry described above, control unit 1 also includes a voltage comparator 28 which compares the order signal I′ with the main order signal I. If the main signal is the smaller of the two the comparator produces a logic output '0,' whereas if the main signal is the larger then the logic output '1' is produced. Connected to the output of the comparator 28 is an AND gate 29 which additionally receives the pulses from the clock generator 5 so that, provided that a "true" (1) output is produced from the comparator, this latter pulse is applied to a one-stage register 30. This register is thus forced into a condition corresponding to that assumed by the comparator at time $t$=0 and remains in this condition until the next clock pulse.

The output from this register is connected to a further AND gate 31 which additionally receives the clock pulses via a delay circuit 32, introducing a delay of, say, 250 microseconds. In turn, the output from this gate 31, if any, is applied to the OR gate 24 previously mentioned.

Thus, in operation, assuming that the main order signal I is increasing, the new value is transmitted over the link 3 to the remote control unit 2 and, if received correctly, the register 18 is updated to this new value. If the transmitted signal is not error-free, the register remains at its previous value.

The order signal I is also applied to the comparator 28 in the unit 1, and under these conditions, i.e., I greater than I′, the register 30 is forced to assume the logic value "1" at $t$=0 . At $t$=250 microseconds the output from this register is applied via the AND gate 31 and OR gate 24 to condition AND gate 8 and permits the register 25 to be updated to this new value. Thus, the local order signal I′ is correctly updated irrespective of the condition assumed by the remote control unit 1 and whether or not the check signal transmitted back over the link 4 during the current 50-millisecond clock period is correctly received.

Assuming now that the main order signal is decreasing, the register 30 assumes the logic value "0" and no action is taken at $t$=250 microseconds to update the register 25. Any order to change the value of this register can now only be effected by the check signal transmitted back over the link 4 and, in turn, this can only be done provided that the register 18 in the control unit 2 has been correctly updated, i.e., that the signal transmitted over the link 3 is error-free.

Accordingly, during any given clock period, the local order signal I'' is always updated immediately on receipt of a correct signal; updating of the local order signal I' is either immediate, or on receipt of the check signal, but is always such as to present even a temporary decrease in the difference between I' and I'' so that collapse of transmission over the DC link can never occur. This is true whether the links 3 and/or 4 are merely suffering from interference or whether either or both have failed completely, in which latter case the register 18 remains permanently at its last correct value, as also does register 25 if the main order signal is falling.

Although the control system has been described with reference to a particular embodiment, it is to be understood that various modifications may readily be made without departing from the scope of this invention. For example, although the main order signal I has been shown to originate from the rectifier station, it may equally well originate from the invertor, the control unit 2 then being at the rectifier station, in which case the logic convention of the voltage comparator 28 would be reversed and the signal ΔI would be subtracted from the output of the digital/analogue converter 26 rather than as shown.

Further, it is to be understood that the timing periods mentioned in the particular description are not to be considered as limiting in any way, and although the invention has been described in relation to current order signals, power order signals may alternatively be employed, the AC/DC converters then being controlled for a proportional DC power instead of current.

I claim:

1. A telecommunication control system for controlling first and second converters in a high-voltage DC transmission link, said system including first and second control units for applying first and second control signals to said first and second converters, respectively, each of which control signals is updated from time to time to cause the respective converter to supply an electrical output of a level which is required at that time, means in said first control unit for generating said first control signal in response to a main control signal and for transmitting a third control signal to said second control unit, means in said second control unit for receiving and checking said third control signal and operative if said third control signal is error-free to transmit a check signal back to said first control unit and to update said second control signal, said means in said first control unit being operative to update said first control signal only if it receives the check signal or if the main control signal bears a predetermined relationship to said first control signal.

2. A system as claimed in claim 1, in which said first and third control signals are generated as a result of periodic sampling of said main control signal.

3. A system as claimed in claim 2, in which said means in said first control unit includes a first register into which a representation of the main control signal is entered and from which said first control signal is derived, said representation being updated only at each sampling period at which the check signal is received or the main control signal bears said predetermined relationship to the first control signal.

4. A system as claimed in claim 3, including means to compare said main and first control signals and to generate a logic output signal the significance of which is dependent upon which of said control signals is larger.

5. A system as claimed in claim 4, including first gating means which is opened by coincidence between said logic output signal of a predetermined significance and a clock signal to cause a single-stage register to generate an output signal for use in updating the first control signal.

6. A system as claimed in claim 5, in which the output signal from the single-stage register is operative, in conjunction with a delayed clock signal, to operate second gating means to enter an updated representation of the main control signal into said first register.

7. A system as claimed in claim 1, in which said predetermined relationship is such that said main control signal is less than the first control signal if the first converter is operating as an invertor, and is greater than the first control signal if the first converter is operating as a rectifier.

8. A system as claimed in claim 1, in which said second control unit includes a second register into which said third control signal is entered and from which said third control signal is read out, if it is error-free, for forming said second control signal.

9. A system as claimed in claim 8, in which said third control signal, when read out from the second register, is transformed into an analogue signal from which a fixed signal is subtracted to form said second control signal.

10. A system as claimed in claim 1, in which said first and second control signals are current order signals.

11. A system as claimed in claim 1, in which said first and second control signals are power order signals.

* * * * *